Dec. 15, 1931.  M. H. TONCRAY  1,836,094
ADJUSTABLE WINDLACE
Filed Jan. 31, 1928
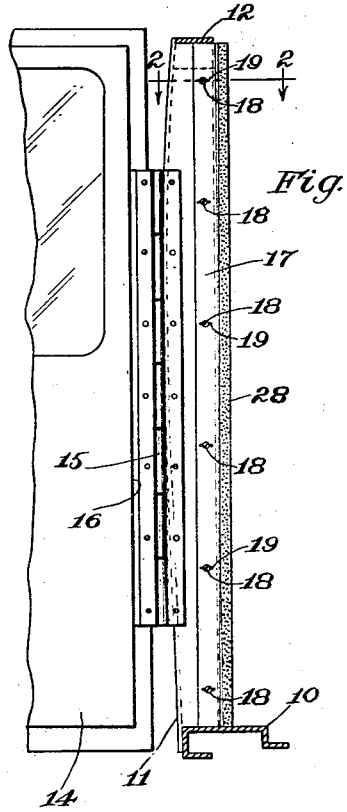
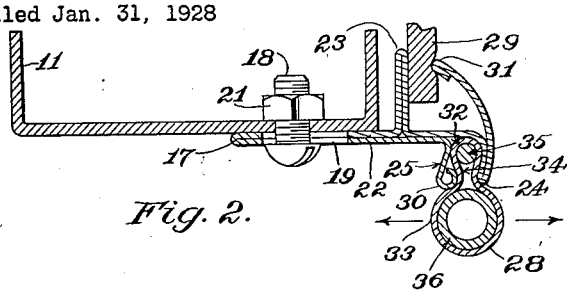
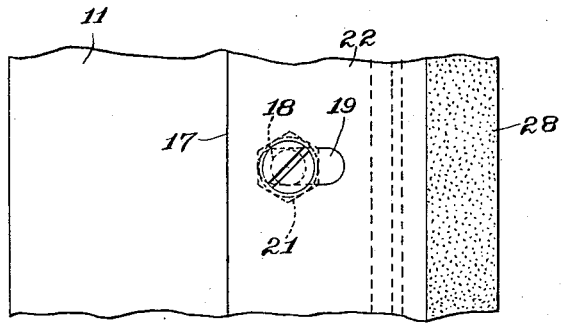
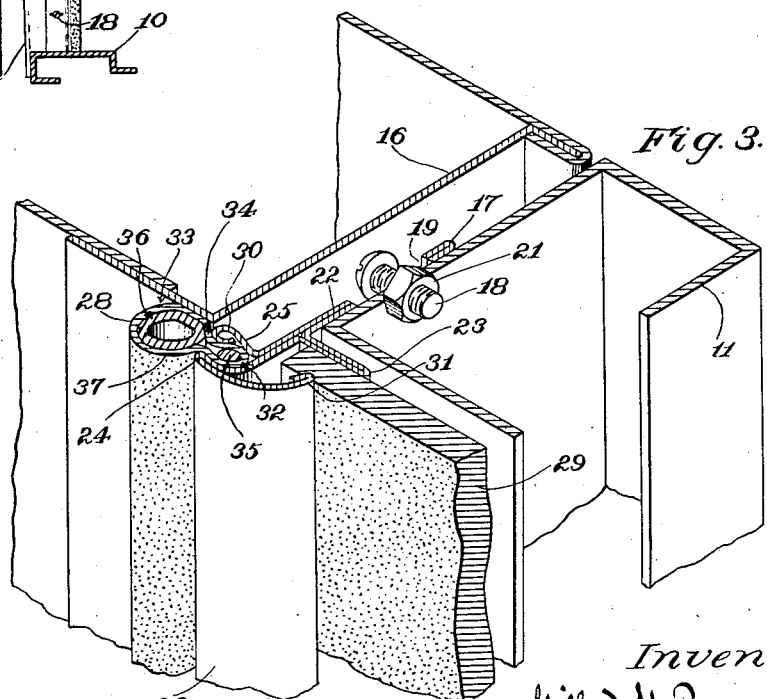
Inventor:
Millard H. Toncray.
By Macleod, Calver, Copeland & Dike.
Attorneys.

Patented Dec. 15, 1931

1,836,094

UNITED STATES PATENT OFFICE

MILLARD H. TONCRAY, OF DETROIT, MICHIGAN, ASSIGNOR TO HUDSON MOTOR CAR COMPANY, OF DETROIT, MICHIGAN, A CORPORATION OF MICHIGAN

ADJUSTABLE WINDLACE

Application filed January 31, 1928. Serial No. 250,922.

This invention relates to automobile bodies and more particularly to the provision of a member for retaining a windlace.

It is an object of the invention to provide a member of low cost which may be adjusted to bring the windlace in position against the door and also, if desired, serve as a retainer for one end of an interior trim panel. In its preferred form, the retainer of the invention is formed of sheet metal folded to provide a body portion having flanges extending in opposite directions therefrom and which cooperate with the opposite ends of the sheet metal member to retain a windlace and also hold one edge of an interior trim panel.

The invention will be more clearly understood from the following description in conjunction with the accompanying drawings, in which, Fig. 1 is a sectional elevational view taken through the door frame of an automobile body embodying the invention;

Fig. 2 is a sectional view taken on the line 2—2 of Fig. 1;

Fig. 3 is a similar sectional view in perspective; and

Fig. 4 is a detail elevational view showing the mounting of the retainer of the invention upon a body pillar.

Before explaining in detail the present invention, and the method or mode of operation embodied therein, it is to be understood that the invention is not limited in its application to the details of construction and arrangements of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

An automobile body embodying the invention as shown in the drawings comprises longitudinal body sills 10 carrying body hinge pillars 11 each forming one side of a door frame which is connected to the opposite side member (not shown) by top frame member 12. Doors 14 are mounted upon the hinge pillars 11 by hinges 15 extending between and suitably secured to the adjacent door posts 16 and body pillars 11.

A sheet metal member 17 is secured to each pillar 11 by bolts 18 passing through elongated slots 19 in the member 17 and openings 19 in the pillar 11 and held securely against the latter by nuts 21 engaging the bolts 18. In the form selected for illustration, the member 17 is made from sheet metal folded to provide superposed portions forming a body portion 22 engaging the side of the pillar 11 and flanges 23 and 24 extending in opposite directions therefrom and which cooperate with the opposite ends 25 and 26 to provide clamping portions for holding a windlace 28 and one edge of an interior trim panel 29. Preferably, the ends 25 and 26 are curled to form beads 30 and 31. The windlace 28 may be of any suitable construction and in the form illustrated comprises a rib 32, which is held between the flange 24 and end 25, an enlarged door engaging portion 33 and a web 34 connecting said rib and door engaging portion. In its preferred form, the windlace comprises a cord 35 forming the rib 32 and a piece of rubber tubing 36 forming the door engaging portion, said rib and tubing being enclosed and connected by suitable fabric 37 which forms the web 34.

In assembly, the member 17 is secured in adjusted position upon the pillar 11 by the bolts 18 so as to bring the door engaging portion of the windlace into contact with the inner surface of the door when in closed position. The edge of the interior trim panel 29 is then inserted between the flange 23 and the beaded end 26. The arrangement affords a low cost but durable construction which may be adjusted readily at any time to maintain the proper relation between the door and windlace while maintaining the same general appearance within the interior of the automobile.

What I claim is:

1. In combination with an automobile body door pillar and a door, a member mounted on said pillar on a surface transverse to the face of said door and provided near one edge with oppositely disposed clamping portions, one to hold a windlace in position to engage said door, the other to receive and hold one end of an interior trim panel, means for permitting adjustment of said member towards the face of the door, and means for maintaining the member in adjusted position.

2. In combination with an automobile body door pillar and a door, a sheet metal member mounted on said pillar on a surface transverse of the face of said door and folded to provide a body portion and oppositely extending flanges with which the opposite ends of the member cooperate to provide retaining portions for a windlace and interior trim panel, means permitting adjustment of said member towards the face of the door, and means for positively maintaining the member in adjusted position.

3. In combination with an automobile body door pillar and a door, a sheet metal member folded to provide superposed portions forming a body and oppositely extending flanges, the end portions of said member extending in opposite directions substantially right angularly from said superposed portions and cooperating with said flanges to provide retaining portions for a windlace and interior trim panel.

4. In combination with an automobile body door pillar and a door, a sheet metal member folded to provide a body portion and oppositely extending flanges with which the opposite ends of the member cooperate to provide retaining portions for a windlace and an interior trim panel, said body portion having an elongated slot, and a bolt passing through said slot and engaging said pillar.

5. In combination with an automobile body door pillar and a door, a sheet metal member folded to provide a body portion and oppositely extending flanges with which the opposite ends of the member cooperate to provide retaining portions for a windlace and interior trim panel, a plurality of elongated slots in said body portion, and bolts passing through said slots and engaging said pillar, to permit adjustment of said member toward the face of the door.

6. In combination with an automobile body door pillar and a door, a sheet metal member folded to provide a body portion and oppositely disposed clamping portions extending substantially perpendicularly to said body portion, one to hold a windlace in position to engage said door and the other to receive and hold one end of an interior trim panel.

7. In combination with an automobile body door pillar and a door, a sheet metal member folded to provide a body portion and oppositely disposed clamping portions extending substantially perpendicularly to said body portion, one to hold a windlace in position to engage said door and the other to receive and hold one end of an interior trim panel, the body portion of said sheet metal member being secured to said pillar on a surface transverse to the face of said door.

8. In combination with an automobile body door pillar and a door, a sheet metal member folded to provide superposed portions forming a body and oppositely extending flanges, the end portions of said member extending in opposite directions substantially right angularly from said superposed portions and cooperating with said flanges to provide retaining portions for a windlace and interior trim panel, the superposed portion of said sheet metal member being secured to said pillar on a surface transverse to the face of said door.

9. In combination with an automobile body door pillar and a door, a sheet metal member folded to provide a body portion and oppositely disposed clamping portions extending substantially perpendicularly to said body portion, one to hold a windlace in position to engage said door and the other to receive and hold one end of an interior trim panel, the body portion of said sheet metal member being mounted on said pillar on a surface transverse to the face of said door and carrying means permitting adjustment of said member towards the face of the door.

In testimony whereof I affix my signature.

MILLARD H. TONCRAY.